United States Patent
Smith

(10) Patent No.: US 6,222,292 B1
(45) Date of Patent: Apr. 24, 2001

(54) MAGNETIC DRIVE ADAPTER

(76) Inventor: Ryan Smith, 11 Northgren Pkwy., Brownsburg, IN (US) 46112

( * ) Notice: Subject to any disclaimer, the term of this patent is extended or adjusted under 35 U.S.C. 154(b) by 0 days.

(21) Appl. No.: 09/469,782

(22) Filed: Dec. 22, 1999

(51) Int. Cl.[7] ................................................. H02K 5/00
(52) U.S. Cl. .................... 310/91; 310/75 D; 123/149 A; 74/440
(58) Field of Search ............................. 310/91, 75 D, 310/103; 123/41.49, 149 A, 149 R, 149 L, 146.5; 74/440

(56) References Cited

U.S. PATENT DOCUMENTS

| | | | |
|---|---|---|---|
| 4,066,048 | 1/1978 | Premus | 123/41.49 |
| 4,285,305 | 8/1981 | Kaufman et al. | 123/146.5 A |
| 5,729,886 | * 3/1998 | Olson et al. | 29/598 |

* cited by examiner

Primary Examiner—Nestor Ramirez
Assistant Examiner—Thanh Lam
(74) Attorney, Agent, or Firm—Kyle Brant

(57) ABSTRACT

A magnetic drive adapter for use with a plurality of outer drive magnet assemblies having various diameter drive hubs is disclosed. The magnetic drive adapter includes a hollow cylindrical portion having an external protrusion extending axially along the outer surface of the hollow cylindrical portion, and an internal protrusion extending axially along the inner surface of the hollow cylindrical portion. The internal protrusion mates with a drive shaft of a motor. The external protrusion mates with a cylindrical hub of an outer drive magnet assembly used in magnetically driven pump devices.

2 Claims, 1 Drawing Sheet

MAGNETIC DRIVE ADAPTER

FIELD OF THE INVENTION

This invention relates in general to magnetically driven pump assemblies and more specifically to a device that facilitates attachment of multiple outer drive magnet assemblies to a given motor shaft.

BACKGROUND OF THE INVENTION

Magnetically driven fluid pump manufacturers supply outer drive magnet assemblies that are mounted or attached to the output shaft of an electric motor. The outer drive magnet assembly is typically disposed on the motor output shaft and held in place using a shaft key and a set screw. The outer drive magnet assembly rotates with the motor output shaft. The outer drive magnet assembly of several manufacturers are one-piece assemblies. Manufacturers of such devices include Ansimag Inc. of Elk Grove, Ill.

Outer drive magnet assembly characteristics vary in accordance with required magnet strength, horsepower (hp) requirements of the pump, RPM (revolutions per minute) of the motor and the bore and keyway dimensions of the motor output shaft. The same outer drive magnet assembly can be used with several horsepower and RPM ranges. For example, the same magnet assembly can be used for 1 hp through 5 hp pumps operating at 3500 RPM. A different magnet assembly may be used for 7.5 hp through 15 hp at 3500 RPM. The internal bore and keyway dimensions of the shaft to which the magnet assembly is attached are the only differences in the outer drive magnet mechanisms for several horsepower and RPM ranges. Manufacturers currently address this difference by fabricating completely different outer drive magnet assemblies for each different motor shaft diameter. The outer drive magnet mechanism is quite costly relative to the total cost of the pump. The added cost is passed on to distributors and end users of the outer drive magnet mechanism. The outer drive magnet mechanism is costly to manufacture, expensive to maintain as an inventory item (for manufacturers, distributors and end users) and occupies valuable inventory shelf space.

There is a need for an adapter mechanism to make the outer drive magnet assemblies more versatile in their application. Creating added versatility in the application of outer drive magnet assemblies can reduce manufacturing overhead costs and thus reduce purchasing and inventory costs to manufacturers, distributors and end users. End users would benefit in that they would only be required to stock the largest bore diameter outer drive magnet assembly for each pump/horsepower/RPM range, along with the appropriate adapter, thereby reducing inventory costs and adding flexibility and convenience in replacing outer drive magnet assemblies.

SUMMARY OF THE INVENTION

A shaft adapter for use with an outer drive magnet assembly having an internal bore adapted to receive the output shaft of a motor, according to one aspect of the present invention, comprises a cylindrical member having an axially aligned cylindrical aperture therein adapted to receive the output shaft of the motor, and wherein the cylindrical member has an outer diameter sized to correspond with the internal bore of the outer drive magnet assembly, means for positively engaging the output shaft of the motor disposed within the cylindrical aperture and attached to the cylindrical member, and means for positively engaging the outer drive magnet assembly attached to the cylindrical member.

One object of the present invention is to provide a more economical mechanism for attaching a variety of outer drive magnet assemblies to motor shafts.

Another object of the present invention is to eliminate the need to maintain inventory of a variety of outer drive magnet assemblies if the supplier thereof produces the magnet assemblies in a multitude of sizes yet the user desire to use a standard motor to drive all the magnet assemblies.

These and other objects of the present invention will become more apparent from the following description of the preferred embodiment.

DESCRIPTION OF THE PREFERRED EMBODIMENT

Figure 1:
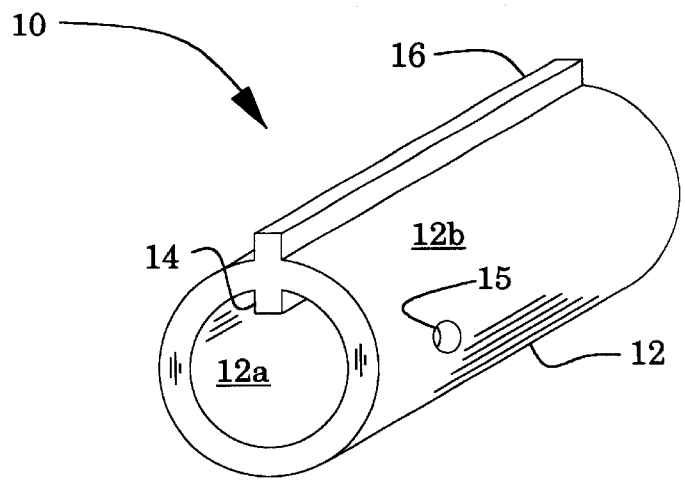
FIG. 1 is a perspective view of a magnetic drive adapter according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a magnetic drive adapter 10 according to the present invention is shown. Adapter 10 includes a cylindrical portion 12 that includes a coaxial cylindrical bore therethrough, an internal protrusion 14 that extends inwardly from the inner surface 12a of cylindrical portion 12 along the entire length of the cylindrical portion 12, and an external protrusion 16 that extends outwardly from the external surface 12b of cylindrical portion 12. Internal protrusion 14 and external protrusion 16 are rectangular in cross-section as shown in FIG. 1 but are contemplated as having any cross-section necessary to mate with a motor drive shaft and an outer drive magnet typical of a magnetically driven pump. Aperture 15 receives a set screw (not shown) to secure adapter 10 to an outer drive magnet assembly (shown in FIG. 2).

Figure 2:
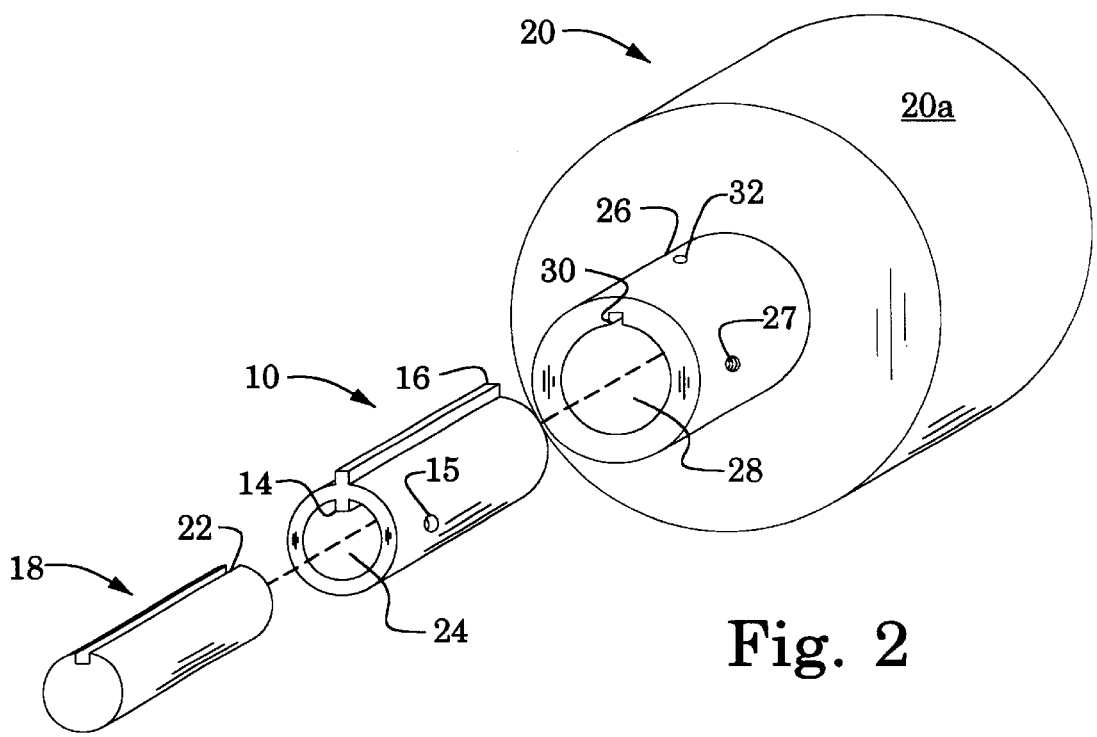
FIG. 2 is an exploded perspective view of an outer drive magnet assembly, the magnetic drive adapter of the present invention and a motor shaft.

Referring now to FIG. 2, an exploded perspective view of magnetic drive adapter 10, motor shaft 18 and outer drive magnet assembly 20 is shown. Motor shaft 18 is disposed in aperture 24 within adapter 10. A set screw or bolt (not shown) is rotatably inserted into threaded aperture 27. The set screw (not shown) inserted into aperture 27 passes through aperture 15 and secures shaft 18 to hub portion 26 of outer drive magnet assembly 20. Keyway 22 mates with internal protrusion 14 to provide a positive mechanical drive connection between motor shaft 18 and adapter 10. Both keyway 22 and internal protrusion 14 are shown having a rectangular cross-section, however, spline style mechanical interfaces, as well as other mechanical shaft drive connections well known in the art, are also contemplated. Hub portion 26 of outer drive magnet 20 includes a cylindrical aperture 28 wherein adapter 10 is received. Keyway 30 receives external protrusion 16 and provides a positive drive connection between hub 26 and adapter 10. A second set screw (not shown) inserted into threaded aperture 32 secures adapter 10 to hub 26 of magnet assembly 20. Outer drive magnet assembly 20 includes a plurality of magnets (not shown) disposed within cylindrical portion 20*a* of assembly 20 that magnetically couple with a magnetic pump drive assembly (not shown).

Adapter 10 is constructed of metal, plastic or other durable synthetic materials well known in the art. Adapter 10 is manufactured in a variety of internal and external bore sizes to provide a multitude of motor shaft and outer drive magnet assembly coupling capabilities. A collection of adapters 10 having varying internal and external diameters eliminates the need to maintain an inventory of motors and outer drive magnet assemblies where motor shaft diameter and outer drive magnet assembly hub diameter may vary.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A shaft adapter for use with an outer drive magnet assembly having an internal bore adapted to receive an output shaft of a motor, said shaft adapter comprising:

a cylindrical member having an axially aligned cylindrical aperture therein adapted to receive the output shaft of the motor, and wherein said cylindrical member has an outer diameter sized to correspond with the internal bore of the outer drive magnet assembly;

first means for rotationally engaging the output shaft of the motor disposed within said cylindrical aperture and attached to said cylindrical member; and second means for rotationally engaging the outer drive magnet assembly attached to said cylindrical member, said second means being disposed on and attached to the lateral surface of said cylindrical member.

2. A shaft adapter for use with an outer drive magnet assembly having an internal bore adapted to receive an output shaft of a motor, said shaft adapter comprising:

a cylindrical member having an axially aligned cylindrical aperture therein adapted to receive the output shaft of the motor, and wherein said cylindrical member has an outer diameter sized to correspond with the internal bore of the outer drive magnet assembly;

first means for rotationally engaging the output shaft of the motor disposed within said cylindrical aperture and attached to said cylindrical member; and second means for rotationally engaging the outer drive magnet assembly attached to said cylindrical member, said second means being disposed on and attached to the lateral surface of said cylindrical member, and wherein said first means for rotationally engaging the output shaft of the motor is a rectangular protrusion extending radially inward and situated within said axially aligned cylindrical aperture and said second means for rotationally engaging the outer drive magnet assembly is a rectangular protrusion extending radially outward from said cylindrical member.

* * * * *